US007435041B1

(12) United States Patent
McGill

(10) Patent No.: US 7,435,041 B1
(45) Date of Patent: Oct. 14, 2008

(54) HOLE CUTTING ASSEMBLY FOR PIPES AND WELL CASINGS

(76) Inventor: Ronald L. McGill, 30980 152nd St., New Auburn, WI (US) 54757

( * ) Notice: Subject to any disclaimer, the term of this patent is extended or adjusted under 35 U.S.C. 154(b) by 305 days.

(21) Appl. No.: 11/479,093

(22) Filed: Jun. 30, 2006

Related U.S. Application Data

(60) Provisional application No. 60/700,162, filed on Jul. 19, 2005.

(51) Int. Cl.
*B23B 45/14* (2006.01)

(52) U.S. Cl. ........................................ 408/92; 408/110

(58) Field of Classification Search ............... 408/72 R, 408/76, 79, 80, 87, 92, 95, 97, 110–112, 408/115 R See application file for complete search history.

(56) References Cited

U.S. PATENT DOCUMENTS 2,672,770 A * 3/1954 Buck ........................... 408/76
2,820,377 A * 1/1958 Buck ........................... 408/76
2,849,900 A * 9/1958 Heidtman, Jr. .............. 408/112
3,090,260 A * 5/1963 Brooks et al. ................. 408/92
3,617,140 A * 11/1971 Gates ......................... 408/1 R
3,847,501 A 11/1974 Doty
3,922,107 A 11/1975 Fowler
3,976,091 A 8/1976 Hutton
4,005,945 A 2/1977 Gutman
4,090,805 A * 5/1978 Grimsley .................... 408/111
4,094,612 A 6/1978 Kring
4,152,090 A 5/1979 Harris et al.
4,261,673 A * 4/1981 Hougen ......................... 408/5
D267,011 S * 11/1982 Morris ...................... D15/132
4,390,309 A * 6/1983 Fangmann ................... 408/76
4,422,812 A 12/1983 Linville
4,936,720 A 6/1990 Dolatowski et al.
5,051,044 A 9/1991 Allen
5,163,792 A 11/1992 Slavik
5,800,099 A 9/1998 Cooper
5,879,112 A 3/1999 Ivey
6,050,753 A 4/2000 Turner
6,761,511 B2 7/2004 Turner
D499,002 S 11/2004 Troxell

* cited by examiner

*Primary Examiner*—Daniel W Howell
(74) *Attorney, Agent, or Firm*—Tipton L. Randall

(57) ABSTRACT

A hole cutting assembly for cutting cylindrical conduits includes a base member having first and second V-shaped contact sections at opposite ends thereof. A linear base anchoring member is secured to the base member for encircling a cylindrical conduit and drawing both V-shaped contact sections of the base member against an outer surface of the cylindrical conduit. A support plate member extends perpendicularly from the base member in opposition to one V-shaped contact section. A bearing housing member, secured to the support plate member, includes a cylindrical passage having a cylindrical axis paralleling the support plate member. The cylindrical axis is positioned beyond one end of the base member, and the housing member includes at least two bearings within the cylindrical passage. A cylindrical arbor shaft member is rotatably and slidably mounted within the housing member's cylindrical passage. The shaft member includes a threaded end adjacent the base member and a hexagonal end opposite the base member, with the shaft member's threaded end adapted for securing a cylindrical cutting bit member thereto. Securing the hole cutting assembly to an outer surface of a conduit with the base anchoring member, and attaching a power drill to the arbor shaft member's hexagonal end provides rotation of a cylindrical cutting bit member secured to the threaded end of the arbor shaft member, thereby cutting a hole in the conduit.

21 Claims, 7 Drawing Sheets

HOLE CUTTING ASSEMBLY FOR PIPES AND WELL CASINGS

CROSS-REFERENCE TO RELATED APPLICATIONS, IF ANY

This application claims the benefit under 35 U.S.C. § 119 (e) of provisional application Ser. No. 60/700,162, filed 19 Jul. 2005. Application Ser. No. 60/700,162 is hereby incorporated by reference.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates to an assembly for cutting a hole and, most particularly, to an assembly for cutting a hole in a pipe or in a well casing.

2. Background Information

There are many instances wherein it is necessary to drill a hole in the sidewall of an existing conduit such as a pipe, a well casing, or the like. In most cases, this operation is performed in new construction or in conjunction with a modification of an existing plumbing system. For example, when drilling a well, it is standard practice to provide a below ground level discharge in the well casing for the water at a depth below the deepest penetration of frost in winter. This prevents the water from freezing when pumped close to the surface from deep within the well. It is mandatory to drill the hole, in situ, in order locate the discharge at the proper depth. Other examples include the need to connect piping together in a water supply system or in a sanitary sewer system.

In the past, the practice was to initially drill a small pilot hole in the pipe and then drill a larger hole with the appropriate size drill bit. This arrangement caused numerous problems especially in terms of the precision in forming the hole. In addition, the operation often resulted in damage to the existing conduit, injury to the operator, and/or other difficulties, such as broken hole saws, broken drill bits, excessive chips in the conduit and so forth.

A variety of devices have been developed specifically for cutting holes in pipes or similar conduits, such as well casings. Patents have been granted for a number of these inventions, including the following:

Doty, in U.S. Pat. No. 3,847,501, describes a drill and tap attachment for pipe clamps, particularly a collar puller for metal pipe and the like. Holes are drilled and tapped at intervals in the pie for attaching threaded nipples. The tapping attachment is adjusted by hand which, in turn, operates the drill and tapping unit. Only a small bit is used for drilling the pipe.

In U.S. Pat. No. 3,922,107, Fowler discloses a core drilling device for sewer pipes. The device includes a base secured to the pipe with bolts penetrating the pipe. A drill press type of stand holds a core drill that cuts the pipe through an aperture in the base. The bolts are used to secure a clamping plate that secures a branch pipe to the sewer pipe.

Hutton, in U.S. Pat. No. 3,976,091, describes a pipe tapping tool having a plug means adapted to fit internally within a branch pipe. A boring bar is mounted on the plug means so as to be capable of being linearly or rotatably moved with respect to the plug means and so as to extend through the plug means. A boring means is mounted on one end of the boring bar. A mounting member is secured to the plug means and extends outwardly therefrom. A holding means carried by the mounting means secures the plug means to a branch pipe. The holding means comprises two interfitting yokes adapted to fit around the exterior of the branch pipe so that their extremities are locked together. A separate fastener secures the base of each of the yokes to the mounting means, the fasteners being located on diametrically opposite sides of the branch pipe when the tool is installed.

U.S. Pat. No. 4,005,945 by Gutman discloses a clamp and drill guide apparatus utilized by an operator to aid in manually drilling holes in work pieces, which have an arcuate contour. The apparatus includes a first clamping member, which has a multiplicity of openings axially passing through the first clamping member in a vertical direction. A second clamping member located in alignment with the first clamping member and below such, includes a multiplicity of threaded through openings, which axially pass in the vertical direction and are alignable with each of the through openings in the first clamping member. A pair of screw and nut members clamp the first member to the second member when a work piece is inserted there between. Further, the apparatus provides a mechanism for axially aligning the work piece between the first member and the second member.

In U.S. Pat. No. 4,094,612, Kring describes a plate having a flat surface for mounting the tool to an irregular or curved work piece. The plate has a plurality of depending legs forming a notch between them for straddling the work piece. Means for fastening the plate to the work piece include a roller chain attached to a threaded hook to adjust the length of the chain around a pipe.

Harris et al., in U.S. Pat. No. 4,152,090, describe an apparatus for cutting a hole through the sidewall of a longitudinally extending pipe. This apparatus includes a cylinder saw, i.e., a hole saw, and a portable jig for supporting and guiding the saw during the hole cutting operation. The jig pivots to allow the hole saw to enter the pipe at an angle to begin the hole cutting operation.

U.S. Pat. No. 4,422,812 by Linville discloses a rotatable shell cutter having a cylindrical member which advances to cut into a pipe. A plurality of cutting elements is arranged in a circle at one end of the cylinder. Each cutting assembly comprises a cartridge fixed as one piece to the cylindrical member, such as by brazing or the like, a seat positioned thereon through dowel pins, a cutting insert mounted on the seat through a cooperating V-shaped projection and recess, and a clamp engaging, positioning and securing the cutting element against the seat and also secured to the cartridge for urging all of the cutting assembly elements together. The clamp is fitted for a particular sized pipe.

Dolatowski et al, in U.S. Pat. No. 4,936,720, describe a device for cutting holes in pipe that includes a base configured for attachment normal to a section of pipe and having a track extending the length of the base. A travel plate is slidably engaged in the track and configured for the accommodation of a power drill thereon. A mechanism controls the linear reciprocal movement of the travel plate in the track, the length of the base being just long enough to accommodate the drill and hole drilling bit assembly for operating the apparatus in close quarters. A hole locator, and an adapter for attachment of the base to smaller diameter pipes may also be provided.

U.S. Pat. No. 5,051,044 by Allen discloses an apparatus used to drill holes in existing pipes or other conduits, or virtually any cylindrical object. The apparatus includes a mounting unit which rests upon the pipe to be drilled and a drill mounting apparatus. The drill mounting apparatus is removably mounted to the mounting unit. The drill mounting apparatus is adapted to receive and position a drilling device which forms a hole in the pipe or the like.

In U.S. Pat. No. 5,163,792, Slavik describes a clamp structure that mounts a workpiece between an underlying saddle plate and an uppermost bushing head. The bushing head includes a slidably received guide bushing directed there within in coaxially oriented alignment, with a saddle bore directed within the saddle to provide for alignment of drilling directed through the workpiece. The invention further includes the bushing head and a saddle clamp arranged and mounted on pivoting jaw structure arranged for clamping the workpiece there between.

Cooper, in U.S. Pat. No. 5,800,099, describes a system for using a portable tool for assisting the making of holes in installed pipes, such as water pipes and the like, to prepare for interconnected piping. The system preferably utilizes a hole saw guide bushing, which is contained in a clamp-head at the end of the fixed jaw of a "Vise-Grip"-like device. The clamp-head accommodates various sizes of guide bushings and hole-saws for making various size holes in various size pipes. Other features assist accurate hole positioning, e.g., horizontal and vertical levels, center marks, and V-shaped holding surfaces on the clamp-heads.

U.S. Pat. No. 5,879,112 by Ivey discloses a water supply line tapping tool for allowing plumbers to tap into a main water supply line. The device includes a main shaft having a first end and a second end. The first end is adapted for coupling with a standard portable electric drill. The main shaft has a threaded hole therein disposed inwardly of the second end. The threaded hole receives a screw therein. The second end has an internally threaded receiving collar disposed thereon. A hole saw is coupled with the receiving collar on the second end of the main shaft. The hole saw has an arbor portion. The arbor portion has an internal end extending inwardly of the second end of the main shaft for being engaged by the screw extending within the threaded hole. A sleeve is slidably disposed on the main shaft for coupling with a saddle valve.

In U.S. Pat. No. 6,050,753, Turner describes an apparatus for mounting a drill on the pipe.

The apparatus includes a platform carrying a mounting member for a drill stand. The mounting member slides along a frame which carries a plurality of elongated holes therein. The longitudinal movement allowed by sliding permits a drill mounted on a drill stand to be selectively positioned to bore a hole in a pipe upon which the platform is rigidly clamped. By provision of such a facility, there is no need to loosen the clamping force of the platform upon the pipe.

Turner, in U.S. Pat. No. 6,761,511, discloses a V-shaped frame attached to a pipe to be drilled. The frame may be used with larger pipes by attaching a removable extension plate to the arms of the V-shaped frame, thereby increasing the size of the recess between the arms. The apparatus may be fixed to the pipe by a chain, which connects to the platform and extends around the pipe, or by attaching clips to the frame and attaching the clips to the surface of the pipe by screws, etc.

U.S. Design Pat. No. D 499,002 by Troxell shows a universal guide for a hole saw. The guide appears to include a suction cup device for attaching the guide to a surface and an adjustable portion having overlapping plates, each with a V-shaped opening. The hole saw fits into the square opening formed by the overlapping plates.

Applicant has devised a hole cutting assembly useful for cutting relatively large diameter holes in well casing, pipes and similar conduits which have a generally circular cross section.

SUMMARY OF THE INVENTION

The invention is directed to a hole cutting assembly adapted for cutting cylindrical conduits. The hole cutting assembly includes a base member having first and second V-shaped contact sections at opposite ends thereof. A linear base anchoring member is secured to the base member, the anchoring member adapted for encircling a cylindrical conduit and drawing both V-shaped contact sections of the base member against an outer surface of the cylindrical conduit. A support plate member extends perpendicularly from the base member in opposition to one V-shaped contact section. A bearing housing member is secured to the support plate member, the housing member including a cylindrical passage there through with a cylindrical axis parallel the support plate member. The cylindrical axis is positioned beyond one end of the base member, and the housing member includes at least two bearings within the cylindrical passage. A cylindrical arbor shaft member is rotatably and slidably mounted within the housing member's cylindrical passage. The shaft member includes a threaded end adjacent the base member and a hexagonal end opposite the base member, with the shaft member's threaded end adapted for securing a cylindrical cutting bit member thereto. Securing the hole cutting assembly to an outer surface of a conduit with the base anchoring member, and attaching a power drill to the arbor shaft member's hexagonal end provides rotation of a cylindrical cutting bit member secured to the threaded end of the arbor shaft member, thereby cutting a hole in the conduit.

In a preferred embodiment of the invention, the hole cutting assembly further includes a planar guide member extending perpendicularly from the support plate member adjacent the opposed V-shaped contact portion. The guide member includes an aperture therein sufficiently large to accommodate a cylindrical cutting bit member fastened to the arbor shaft member.

DESCRIPTION OF THE EMBODIMENTS

Nomenclature

| | |
|---|---|
| 10 | Hole Cutting Assembly |
| 15 | Base Member |
| 17 | Center Portion of Base Member |
| 20 | Perpendicular Wall Portions of Base Member |
| 25 | V-shaped Contact Sections of Base Member |
| 30 | Base Anchoring Member |
| 35 | Roller Chain Member |
| 40 | Threaded Stud of Anchor Member |
| 45 | Hook Tab Member |
| 47 | Adjustment Tab Member |
| 50 | Support Plate Member |
| 55 | Bearing Housing Member |
| 60 | Cylindrical Passage in Bearing Housing Member |
| 65 | Threaded Fasteners for Bearing Housing Member |
| 70 | Internal Bearings or Bushings |
| 75 | Arbor Cylindrical Shaft Member |
| 80 | Hexagonal End of Shaft Member |
| 85 | Treaded End of Shaft Member |
| 90 | Cylindrical Cutting Bit Member |
| 95 | Cutting Teeth of Bit Member |
| 100 | Guide End of Base Member |
| 105 | Aperture in Guide End of Base Member |
| A | Cylindrical Axis of Cylindrical Passage |
| C | Cylindrical Well Casing or Pipe |

Construction

The invention is a hole cutting assembly adapted for cutting cylindrical conduits. The hole cutting assembly comprises a base member having first and second V-shaped contact sections at opposite ends thereof. A linear base anchoring member is secured to the base member, the anchoring member adapted for encircling a cylindrical conduit and drawing both V-shaped contact sections of the base member against an outer surface of the cylindrical conduit. A support plate member extends perpendicularly from the base member in opposition to one V-shaped contact section. A bearing housing member is secured to the support plate member, the housing member including a cylindrical passage there through with a cylindrical axis paralleling the support plate member. The cylindrical axis is positioned beyond one end of the base member, and the housing member includes at least two bearings within the cylindrical passage. A cylindrical arbor shaft member is rotatably and slidably mounted within the housing member's cylindrical passage. The shaft member includes a threaded end adjacent the base member and a hexagonal end opposite the base member, with the shaft member's threaded end adapted for securing a cylindrical cutting bit member thereto. Securing the hole cutting assembly to an outer surface of a conduit with the base anchoring member, and attaching a power drill to the arbor shaft member's hexagonal end provides rotation of a cylindrical cutting bit member secured to the threaded end of the arbor shaft member, thereby cutting a hole in the conduit.

In a preferred embodiment of the invention, the hole cutting assembly for cylindrical conduits further includes a planar guide member extending perpendicularly from the support plate member adjacent the opposed V-shaped contact portion. The guide member includes an aperture therein sufficiently large to accommodate a cylindrical cutting bit member fastened to the arbor shaft member.

Figure 1:
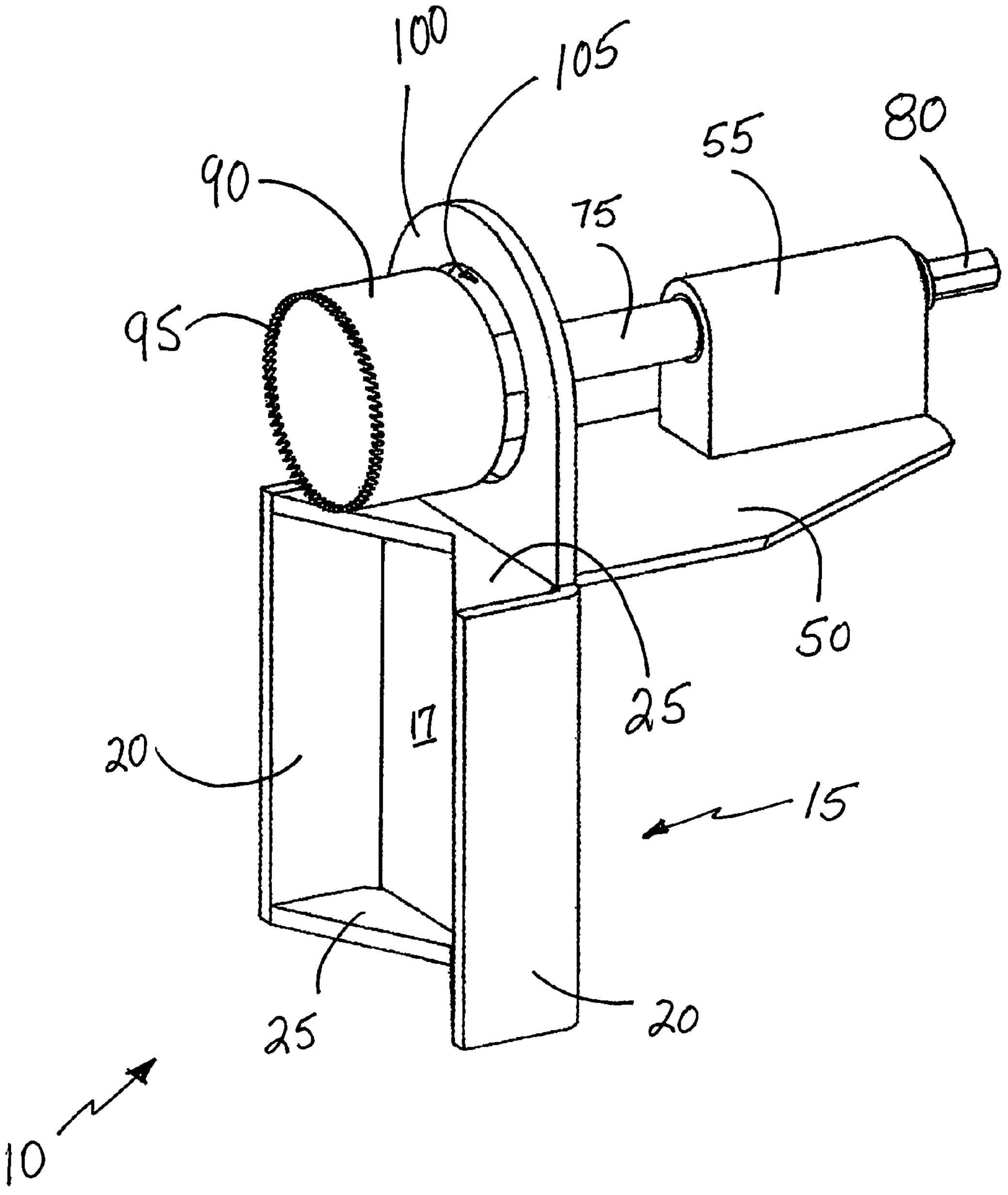
FIG. 1 is a perspective view of the hole cutting assembly of the present invention.
Figure 2:
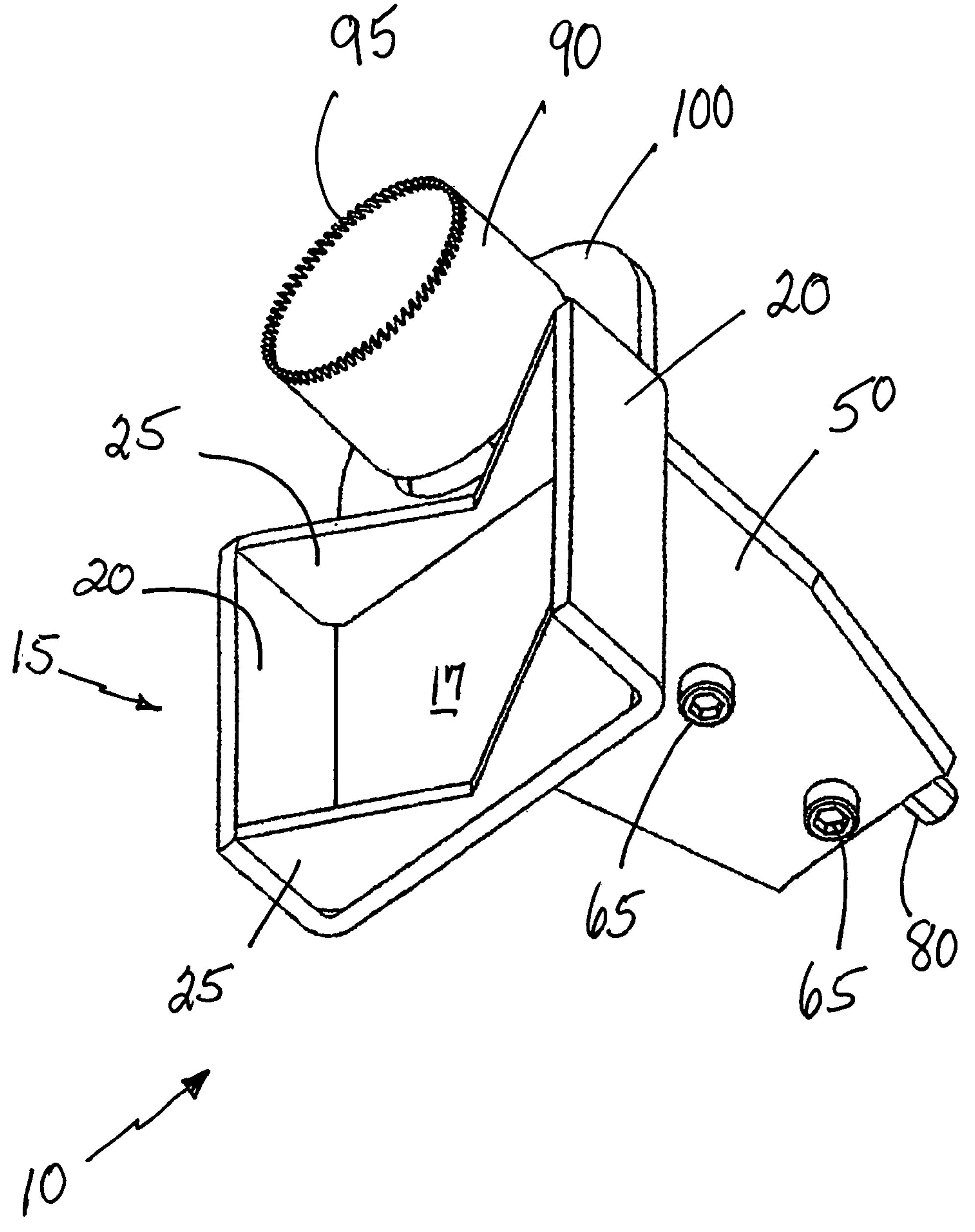
FIG. 2 is another perspective view of the hole cutting assembly of the present invention.

Referring now to FIGS. 1 and 2, perspective views of the hole cutting assembly 10 of the present invention are shown. The hole cutting assembly 10 includes a base member 15 having first and second V-shaped contact sections 25 at opposite ends thereof, as shown in FIGS. 1 and 2. Preferably, the base member 15 includes a center portion 17 and opposed, parallel wall portions 20 extending perpendicularly in a common direction from the center portion 17, with the base member 15 including a first V-shaped contact section 25 secured between first ends of each wall portion 20 and a second V-shaped contact section 25 secured between second ends of each wall portion 25. Most preferably the V-shaped contact sections have an internal angle between about 90 degrees and about 145 degrees to accommodate various diameter conduits C.

Figure 3:
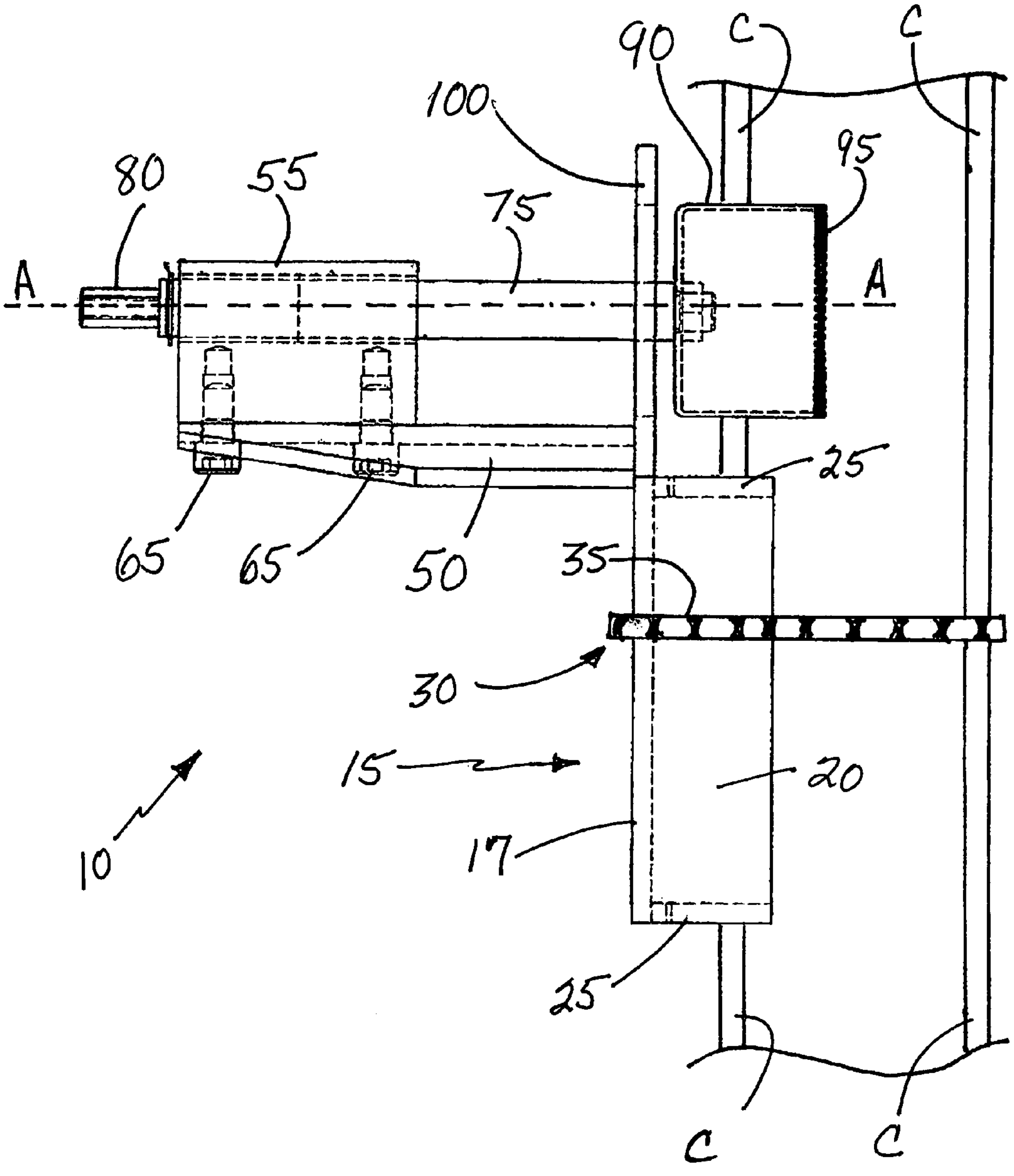
FIG. 3 is a side view of the hole cutting assembly of the present invention secured to a conduit with the cutting bit penetrating the conduit sidewall.
Figure 8:
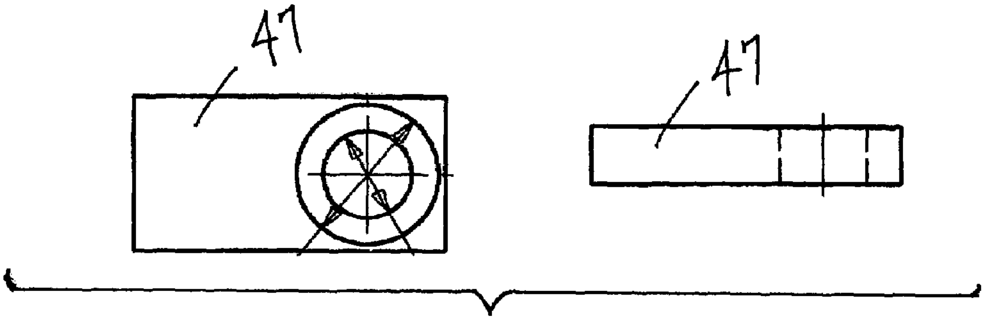
FIG. 8 shows top and side views of the adjustment tab member of the hole cutting assembly of the present invention.
Figure 9:
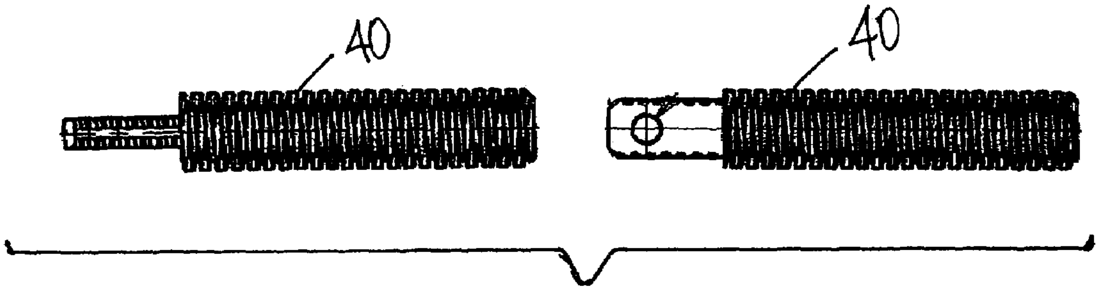
FIG. 9 shows several perspective views of the tightening stud member of the hole cutting assembly of the present invention.

A linear base anchoring member 30 is secured to the base member 15, with the anchoring member 30 adapted for encircling a cylindrical conduit C and drawing both V-shaped contact sections 25 of the base member 15 against an outer surface of the cylindrical conduit C, as illustrated in FIG. 3. Preferably, the anchoring member 30 includes a roller chain member 35 secured at one end to the base member 15 by a hook tab member 45, shown in FIG. 7, and at the other end by an adjustment tab member 47, shown in FIG. 8, secured to the base member 15. A threaded stud member 40 mounted in a threaded aperture in the adjustment tab ember 47 adjusts the length of the linear anchoring member 30. The threaded stud member 40 is shown in FIG. 9. Other similar linear anchoring members 30 can be used to secure the base member 15 to the cylindrical conduit C, with equivalent results.

Figure 4:
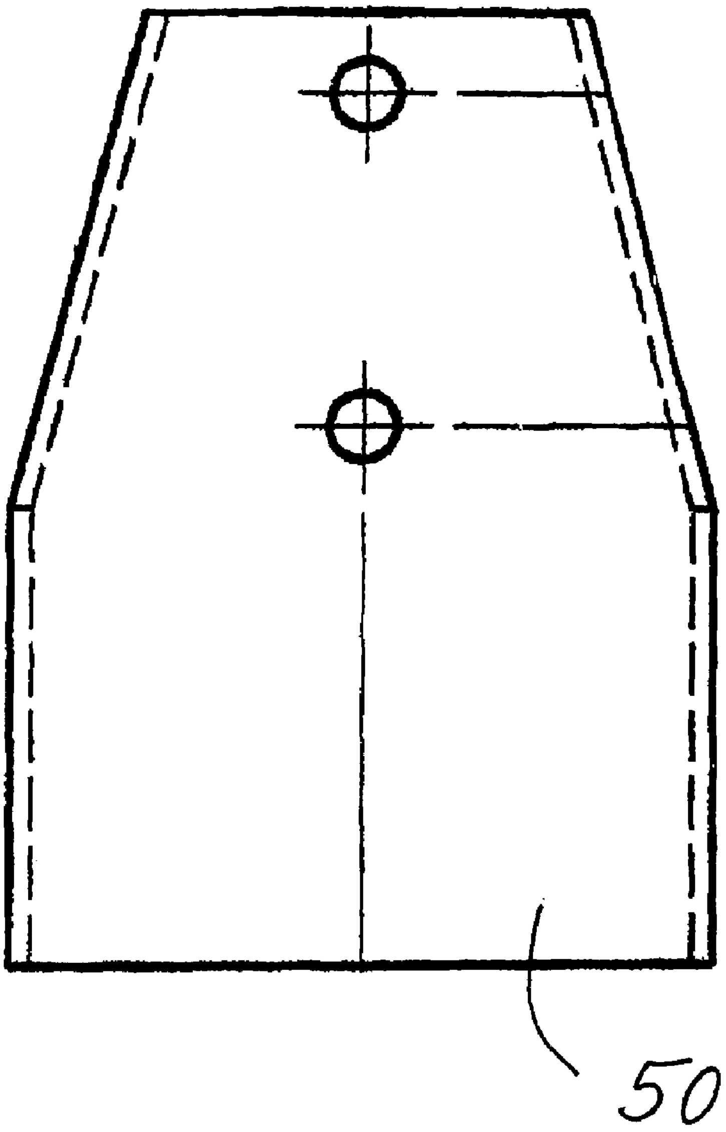
FIG. 4 is a plan view of the support plate member of the hole cutting assembly of the present invention.
Figure 5:
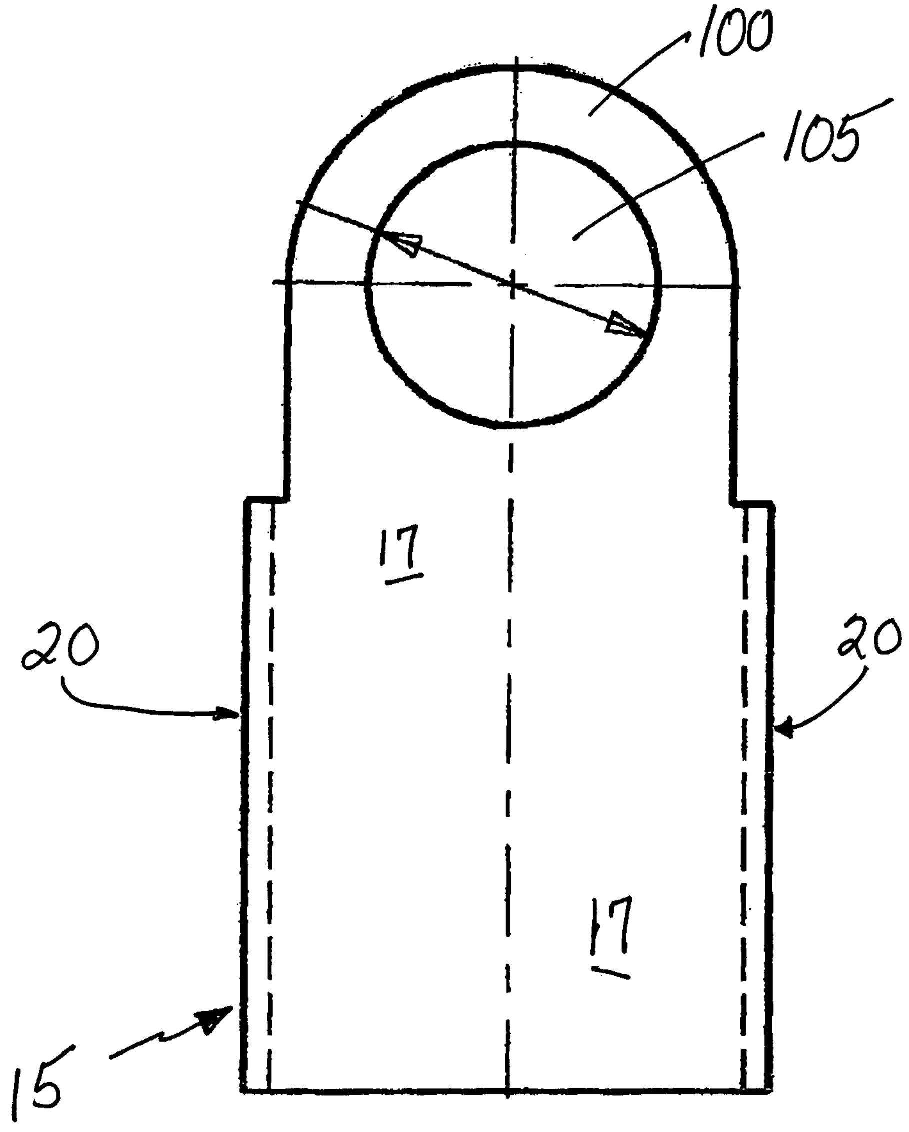
FIG. 5 is a rear view of the base member with the aperture in the guide end of the hole cutting assembly of the present invention.

Referring again to FIGS. 1-3, a support plate member 50 extends perpendicularly from the base member 15 in opposition to one V-shaped contact section 25. The support plate member 50 is shown in greater detail in FIG. 4. A bearing housing member 55 is secured to the support plate member 50 by means of by at least two threaded fasteners 65 penetrating the support plate member 50 and secured in threaded apertures in the bearing housing member 55, as shown in FIG. 3.

The bearing housing member 55 including a cylindrical passage 60 there through with a passage cylindrical axis A paralleling the support plate member 50, as illustrated in FIG. 3. The cylindrical passage 60 and cylindrical axis A are positioned beyond one end of the base member 15, and the bearing housing member 55 includes at least two bearings within the cylindrical passage 60. The bearing housing member 55 is best seen in FIGS. 1 and 3.

Figure 6:
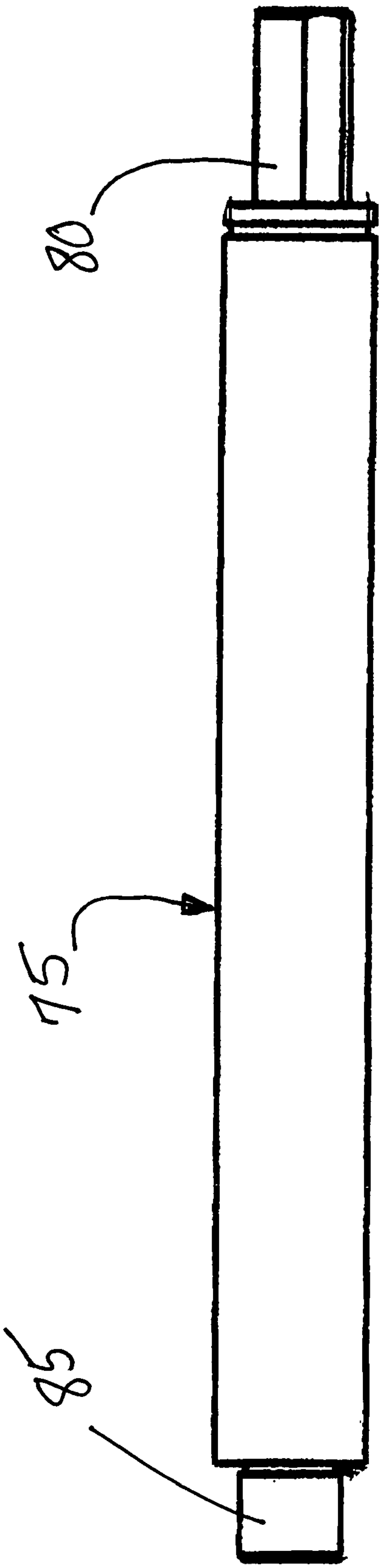
FIG. 6 is a perspective view of the arbor cylindrical shaft member of the hole cutting assembly of the present invention.

A cylindrical arbor shaft member 75 is rotatably and slidably mounted within the housing member's cylindrical passage 60. The shaft member 75 includes a threaded end 85 positioned adjacent the base member 15 and a hexagonal end 80 opposite the base member 15, with the shaft member's threaded end 85 adapted for securing a hole saw, cylindrical cutting bit member 90 thereto. The arbor shaft member 75 is shown in greater detail in FIG. 6, and the cylindrical cutting bit member 90 in FIGS. 1-3.

Figure 7:
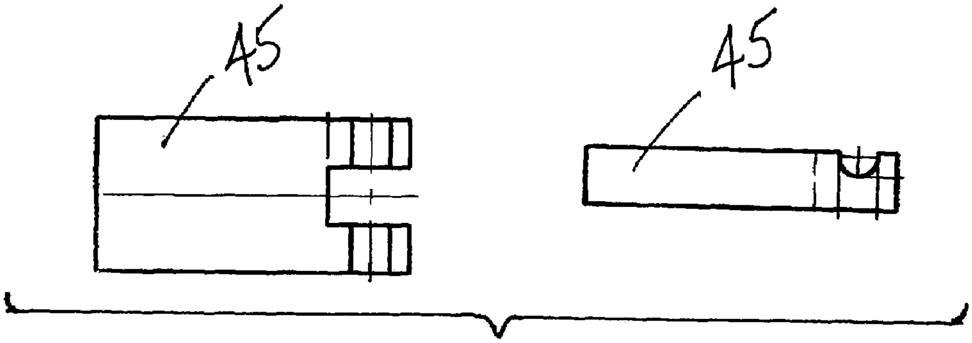
FIG. 7 shows top and side views of the hook tab member of the hole cutting assembly of the present invention.

The operator secures the hole cutting assembly 10 to an outer surface of a conduit C with the base anchoring member 30, and attaching a power drill to the arbor shaft member's hexagonal end 80. The power drill provides rotation of the cylindrical cutting bit member 90 secured to the threaded end 85 of the arbor shaft member 75. The operator advances the arbor shaft member 75 within the bearing housing 55, with the cylindrical cutting bit member 90 cutting a hole in the conduit C, as illustrated in FIG. 3. The components of the base anchoring member 30 are shown in FIGS. 7-9. The base anchoring member includes a roller chain member 35, a threaded tightening stud member 40 secured to one end of the chain member 35 and a hook tab member 45 and adjustment tab member 47 secured at opposite ends of the chain member 35, as described above.

In a preferred embodiment of the invention, the hole cutting assembly 10 for cylindrical conduits C further includes a planar guide member 100 extending perpendicularly from the support plate member 50 adjacent the opposed V-shaped contact portion 25, as illustrated in FIGS. 1-3 and 5. The guide member 100 includes a guide aperture 105 therein sufficiently large to accommodate a cylindrical cutting bit member 90 fastened to the arbor shaft member 75. The cylindrical cutting bit member 90 includes cutting teeth 95 at an end opposite the arbor shaft member 75 for penetrating the cylindrical conduit C, such as a well casing or similar pipe, as illustrated in FIG. 3. The guide member 100 provides additional support for the cylindrical cutting bit member 90 when the cutting teeth 95 first contact a portion of the curved surface of the cylindrical conduit C. The cylindrical cutting bit member 90 is marginally smaller than the guide aperture 105 to minimize sideways movement of the cylindrical cutting bit member 90 during the cutting process. The cylindrical cutting bit member 90 can be easily exchanged for another such bit member 90 should the cylindrical cutting bit member 90 become dull or damaged. Smaller diameter cylindrical cutting bit members 90 may be used, the only limitation being that the bit member 90 fits into the guide aperture 105.

While the invention has been particularly shown and described with reference to preferred embodiments thereof, it will be understood by those skilled in the art that various changes in form and details may be made therein without departing from the spirit and scope of the invention.

I claim:

1. A hole cutting assembly adapted for cutting cylindrical conduits comprising:

a base member having first and second V-shaped contact sections at opposite ends thereof;

a linear base anchoring member secured to the base member, the anchoring member adapted for encircling a cylindrical conduit and drawing both V-shaped contact sections of the base member against an outer surface of the cylindrical conduit;

a support plate member extending perpendicularly from the base member in opposition to one V-shaped contact section;

a bearing housing member secured to the support plate member, the housing member including a cylindrical passage there through with a cylindrical axis parallel the support plate member, the cylindrical axis positioned beyond one end of the base member, the housing member including at least two bearings within the cylindrical passage; and a cylindrical arbor shaft member rotatably and slidably mounted within the housing member's cylindrical passage, the shaft member including a threaded end adjacent the base member and a hexagonal end opposite the base member, the shaft member's threaded end adapted for securing a cylindrical cutting bit member thereto;

whereby securing the hole cutting assembly to an outer surface of a conduit with the base anchoring member, and attaching a power drill to the arbor shaft member's hexagonal end provides rotation of a cylindrical cutting bit member secured to the threaded end of the arbor shaft member, thereby cutting a hole in the conduit.

2. The hole cutting assembly adapted for cutting cylindrical conduits of claim 1, further including a planar guide member extending perpendicularly from the support plate member adjacent the opposed V-shaped contact portion, the guide member including an aperture therein aligned with the cylindrical arbor shaft member, the aperture sufficiently large to accommodate a cylindrical cutting bit member fastened to the arbor shaft member.

3. The hole cutting assembly adapted for cutting cylindrical conduits of claim 1, wherein the base member includes a center portion and opposed, parallel wall portions extending perpendicularly in a common direction from the center portion, the base member including a first V-shaped contact section secured between first ends of each wall portion and a second V-shaped contact section secured between second ends of each wall portion.

4. The hole cutting assembly adapted for cutting cylindrical conduits of claim 1, wherein the linear base anchoring member is adjustably secured to the base member.

5. The hole cutting assembly adapted for cutting cylindrical conduits of claim 1, wherein the linear base anchoring member includes a roller chain adjustably secured at a first end to the base member and at a second end to the base member.

6. The hole cutting assembly adapted for cutting cylindrical conduits of claim 1, wherein the bearing housing member is secured to the support plate member by at least two threaded fasteners penetrating the support plate member.

7. The hole cutting assembly adapted for cutting cylindrical conduits of claim 1, wherein the first and second V-shaped contact sections are separated by at least about four inches.

8. The hole cutting assembly adapted for cutting cylindrical conduits of claim 1, wherein the V-shaped contact sections have an internal angle between about 90 degrees and about 145 degrees.

9. The hole cutting assembly adapted for cutting cylindrical conduits of claim 1, wherein the cylindrical passage through the bearing housing member has a length of at least about 2.5 inches.

10. A hole cutting assembly adapted for cutting cylindrical conduits comprising:

a base member including a center portion and opposed, parallel wall portions extending perpendicularly in a common direction from the center portion, the base member including a first V-shaped contact section secured between first ends of each wall portion and a second V-shaped contact section secured between second ends of each wall portion;

a linear base anchoring member adjustably secured at a first end to one wall portion and at a second end to the other wall portion, the anchoring member adapted for encircling a cylindrical conduit and drawing the conduit against the V-shaped contact sections of the base member;

a support plate member extending perpendicularly from the base member in opposition to one V-shaped contact section;

a bearing housing member secured to the support plate member, the housing member including a cylindrical passage there through with a cylindrical axis parallel the support plate member and beyond one end of the base member, the housing member including at least two bearings within the cylindrical passage;

a cylindrical arbor shaft member rotatably and slidably mounted within the housing member's cylindrical passage, the shaft member including a threaded end adjacent the base member and a hexagonal end opposite the base member, the shaft's threaded end adapted for securing a cylindrical cutting bit member thereto; and a planar guide member extending perpendicularly from the support plate member adjacent the opposed V-shaped contact portion, the guide member including an aperture therein aligned with the cylindrical arbor shaft member, the aperture sufficiently large to accommodate a cylindrical cutting bit member fastened to the arbor shaft member;

whereby securing the hole cutting assembly to an outer surface of a conduit with the base anchoring member, and attaching a power drill to the arbor shaft member's cylindrical end provides rotation of the cylindrical cutting bit member secured to the threaded end of the arbor shaft member, thereby cutting a hole in the conduit.

11. The hole cutting assembly adapted for cutting cylindrical conduits of claim 10, wherein the linear base anchoring member is adjustably secured to the base member.

12. The hole cutting assembly adapted for cutting cylindrical conduits of claim 10, wherein the linear base anchoring member includes a roller chain adjustably secured at a first end to the base member and at a second end to the base member.

13. The hole cutting assembly adapted for cutting cylindrical conduits of claim 10, wherein the bearing housing member is secured to the support plate member by at least two threaded fasteners penetrating the support plate member.

14. The hole cutting assembly adapted for cutting cylindrical conduits of claim 10, wherein the first and second V-shaped contact sections are separated by at least about four inches.

15. The hole cutting assembly adapted for cutting cylindrical conduits of claim 10, wherein the V-shaped contact sections have an internal angle between about 90 degrees and about 145 degrees.

16. The hole cutting assembly adapted for cutting cylindrical conduits of claim 10, wherein the cylindrical passage through the bearing housing member has a length of at least about 2.5 inches.

17. A hole cutting assembly adapted for cutting cylindrical conduits comprising:

a base member having first and second V-shaped contact sections at opposite ends thereof;

a linear base anchoring member secured to the base member, the anchoring member adapted for encircling a cylindrical conduit and drawing both V-shaped contact sections of the base member against an outer surface of the cylindrical conduit;

a support plate member extending perpendicularly from the base member in opposition to one V-shaped contact section;

a bearing housing member secured to the support plate member, the housing member including a cylindrical passage there through with a cylindrical axis parallel the support plate member, the cylindrical axis positioned beyond one end of the base member, the housing member including at least two bearings within the cylindrical passage;

a cylindrical arbor shaft member rotatably and slidably mounted within the housing member's cylindrical passage, the shaft member including a threaded end adjacent the base member and a hexagonal end opposite the base member; and a cylindrical cutting bit member secured to the threaded end of the cylindrical arbor shaft member for cutting a hole in the cylindrical conduit;

whereby securing the hole cutting assembly to an outer surface of a conduit with the base anchoring member, and attaching a power drill to the arbor shaft member's hexagonal end provides rotation of the cylindrical cutting bit member secured to the threaded end of the arbor shaft member, thereby cutting a hole in the conduit.

18. The hole cutting assembly adapted for cutting cylindrical conduits of claim 17, further including a planar guide member extending perpendicularly from the support plate member adjacent the opposed V-shaped contact portion, the guide member including an aperture therein aligned with the cylindrical arbor shaft member, the aperture sufficiently large to accommodate a cylindrical cutting bit member fastened to the arbor shaft member.

19. The hole cutting assembly adapted for cutting cylindrical conduits of claim 17, wherein the base member includes a center portion and opposed, parallel wall portions extending perpendicularly in a common direction from the center portion, the base member including a first V-shaped contact section secured between first ends of each wall portion and a second V-shaped contact section secured between second ends of each wall portion.

20. The hole cutting assembly adapted for cutting cylindrical conduits of claim 17, wherein the linear base anchoring member includes a roller chain adjustably secured at a first end to the base member and at a second end to the base member.

21. The hole cutting assembly adapted for cutting cylindrical conduits of claim 17, wherein the V-shaped contact sections have an internal angle between about 90 degrees and about 145 degrees, and the first and second V-shaped contact sections are separated by at least about four inches.

* * * * *